US007881054B2

(12) United States Patent
Boss et al.

(10) Patent No.: US 7,881,054 B2
(45) Date of Patent: Feb. 1, 2011

(54) COMPUTER LOCK SYSTEM

(75) Inventors: Gregory J. Boss, American Fork, UT (US); Rick A. Hamilton, II, Charlottesville, VA (US); George R. Langlais, Nashua, NH (US); Timothy M. Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/503,987

(22) Filed: Jul. 16, 2009

(65) Prior Publication Data

US 2009/0273899 A1 Nov. 5, 2009

Related U.S. Application Data

(62) Division of application No. 11/840,038, filed on Aug. 16, 2007, now Pat. No. 7,606,024.

(51) Int. Cl.
*G06F 1/16* (2006.01)

(52) U.S. Cl. .................................. 361/679.57; 70/58
(58) Field of Classification Search ............ 361/679.57; 70/58
See application file for complete search history.

(56) References Cited

U.S. PATENT DOCUMENTS

| | | | | |
|---|---|---|---|---|
| 5,088,156 A | | 2/1992 | Hosoi | |
| 5,255,154 A | * | 10/1993 | Hosoi et al. | 361/679.27 |
| 5,351,508 A | * | 10/1994 | Kelley | 70/58 |
| 5,447,045 A | * | 9/1995 | Cheng | 70/58 |
| 5,757,616 A | * | 5/1998 | May et al. | 361/679.57 |
| 5,787,738 A | * | 8/1998 | Brandt et al. | 70/58 |
| 5,816,081 A | * | 10/1998 | Johnston | 70/58 |
| 5,870,281 A | * | 2/1999 | Kim | 361/679.57 |
| 5,960,651 A | * | 10/1999 | Tanisawa | 70/14 |
| 6,477,871 B1 | * | 11/2002 | Shaw et al. | 70/58 |
| 6,481,681 B1 | | 11/2002 | Stunkel et al. | |
| 6,563,699 B1 | | 5/2003 | Choi | |
| 6,735,698 B1 | * | 5/2004 | Callam | 726/35 |
| 6,958,904 B2 | | 10/2005 | Chuang et al. | |
| 7,028,513 B2 | * | 4/2006 | Avganim | 70/18 |
| 7,299,668 B1 | * | 11/2007 | Lu et al. | 70/58 |
| 7,405,927 B2 | * | 7/2008 | Lev | 361/679.55 |
| 7,492,581 B2 | * | 2/2009 | Kuo | 361/679.55 |
| 7,576,981 B2 | * | 8/2009 | Kuo | 361/679.59 |
| 7,606,024 B2 | * | 10/2009 | Boss et al. | 361/679.57 |
| 2004/0108968 A1 | | 6/2004 | Finke-Anlauff | |
| 2005/0028571 A1 | * | 2/2005 | Merrem et al. | 70/58 |
| 2005/0039502 A1 | * | 2/2005 | Avganim | 70/58 |
| 2005/0097930 A1 | * | 5/2005 | Moore et al. | 70/58 |
| 2008/0013269 A1 | * | 1/2008 | Wong et al. | 361/683 |

* cited by examiner

*Primary Examiner*—Lisa Lea-Edmonds
(74) *Attorney, Agent, or Firm*—William Schiesser; Roberts Mlotkowski Safran & Cole, P.C.

(57) ABSTRACT

A computing device including a first computer portion pivotally connected to a second computer portion by a hinge. The computing device further includes an element moveable between a first position, in which the hinge is free to rotate, and a second position, in which the hinge is substantially prevented from rotating. A lock selectively controls movement of the element between the first and second positions.

17 Claims, 7 Drawing Sheets

COMPUTER LOCK SYSTEM

CROSS-REFERENCE TO RELATED APPLICATIONS

The present application is a divisional of U.S. application Ser. No. 11/840,038, which was filed on Aug. 16, 2007, the disclosure of which is expressly incorporated by reference herein in its entirety.

FIELD OF THE INVENTION

The invention generally relates to a computer lock system, and more particularly to a lock system for locking a foldable (e.g., laptop, notebook, etc.) computer in an open configuration.

BACKGROUND OF THE INVENTION

Laptop computers (also referred to as notebook computers, notebooks, and laptops) are rapidly becoming one of the most popular styles of computing device for both private and commercial users. As integrated circuit features continue to decrease in size and increase in speed, laptop computers routinely offer users computing power that was previously attainable only with desktop computing systems. Moreover, laptop computers provide users with increased mobility, especially when the laptop computer is coupled with a wireless network connection. These benefits have translated to a recent proliferation of laptop computers.

With this increase in laptop computer use, security for these computing devices is becoming more of a concern. Owners of laptop computers want to prevent their machine from being stolen. Moreover, and perhaps more critical, owners of the various information that may be stored on a laptop computer also want to prevent that information from falling into the wrong hands and being used for nefarious purposes, such as, for example, identity theft.

Conventional security devices and systems for laptop computers include cable locks, lockable docking stations, lid locks, and briefcase locks. Such security devices physically secure the laptop computer to a working surface or another object, and utilize keys or other numeric combination style mechanisms to permit authorized access to (i.e., unlock) the computer. These known security devices, however, can typically be broken or beaten (e.g., circumvented) by brute force techniques. That is, conventional cable-locks and pad-locks can be cut or broken. And once such security devices are compromised, the laptop or notebook computer may be easily stolen because it may be folded into a small, compact size that is easily concealed.

The above-described known security devices fail to address a primary reason why laptop computers are so easily stolen: the relatively small size of the laptop computer. In essence, as the size of mobile computing devices becomes smaller and smaller, their rate of theft tends to increase due to the ease of taking a unit and sliding it unobtrusively into a bag, under a jacket, etc. As a result, most methods to deter theft of these devices known in the art are marginally effective, at best.

Accordingly, there exists a need in the art to overcome the deficiencies and limitations described hereinabove.

SUMMARY OF THE INVENTION

In a first aspect of the invention, there is a device comprising a first bar pivotally attached to a first portion of a computer, and a second bar pivotally attached to the first bar and moveable along a track arranged on a second portion of the computer. At least one aperture is arranged in the second bar, and at least one cavity is arranged in the second portion of the computer. The device further comprises a lock that is insertable through the at least one aperture and the at least one cavity when the at least one aperture and the at least one cavity are aligned. The first portion of the computer is rotatable relative to the second portion of the computer when the lock is not inserted through the at least one aperture and the at least one cavity. The first portion of the computer is rotatably locked relative to the second portion of the computer when the lock is inserted through the at least one aperture and the at least one cavity.

In a second aspect of the invention, there is a device comprising a blocking device attached to a first portion of a computer, at least one cavity arranged on a second portion of the computer, and a lock that is insertable into and selectively engageable with the at least one cavity. The first portion of the computer is rotatable relative to the second portion of the computer when the lock is not inserted into the at least one cavity. The first portion of the computer is substantially not rotatable relative to the second portion of the computer beyond a point of the blocking device contacting the lock when the lock is inserted into the at least one cavity.

In a third aspect of the invention, there is a computing device comprising a first computer portion pivotally connected to a second computer portion by a hinge. The computing device further comprises an element moveable between a first position, in which the hinge is free to rotate, and a second position, in which the hinge is substantially prevented from rotating. A lock selectively controls movement of the element between the first and second positions.

DETAILED DESCRIPTION OF EMBODIMENTS OF THE INVENTION

The invention is directed to a lock system structured and arranged to lock a foldable (e.g., laptop, notebook, etc.) computer in a particular orientation. Implementations of the invention employ an insertable lock that prevents movement of the foldable portions of a computer. In this manner, the invention provides a theft deterrent by constraining the foldable computer to an open configuration that is difficult to conceal. The invention can also be used to prevent the inadvertent closing of a foldable computer, such as, for example, when a user is using such a computer in a cramped space.

Figure 1:
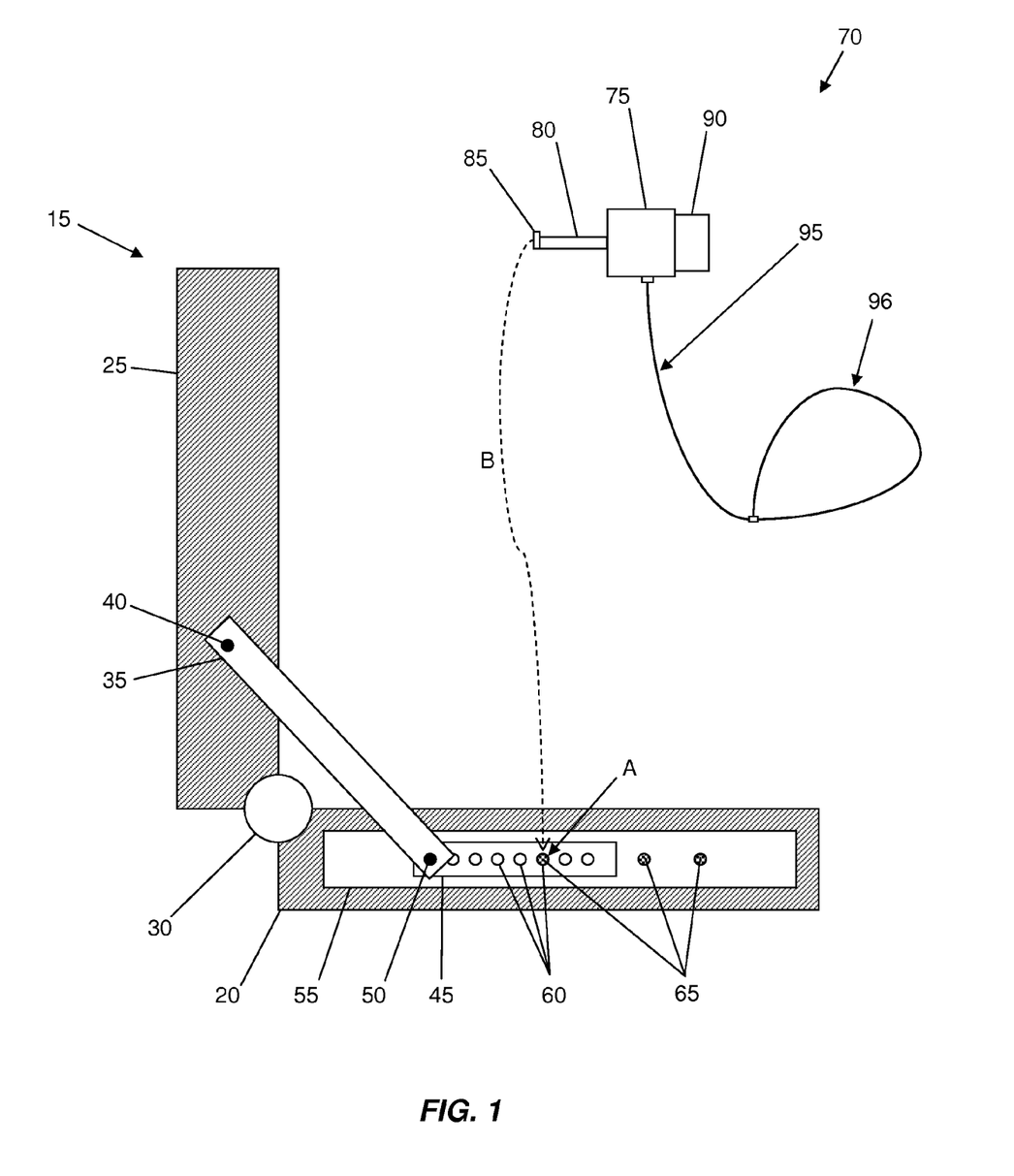
FIG. 1 shows a first embodiment of a lock system according to aspects of the invention.

FIG. 1 shows a first embodiment of a lock system according to aspects of the invention. A foldable computer 15 (e.g., laptop computer, notebook computer, etc.) has base portion 20 and screen portion 25 that are pivotally connected via hinge 30, as is known to those of skill in the art. In embodiments, the base portion 20 comprises a base of the computer that includes, for example, a keyboard, motherboard, hard drive, accessory ports, etc. The screen portion 25 may comprise, for example, a viewable display, and the hinge 30 may comprise, for example, a pivot hinge that connects and allows for pivotal movement between the base and screen portions 20, 25. The base portion 20, screen portion 25, and hinge 30 are conventional as described thus far, may comprise any configuration of components and accessories, and may be arranged in any size or shape as dictated by the intended use of the computer.

In implementations, the lock system includes a pivot bar 35 having one end pivotally connected to a side of the screen portion 25 via pivot 40. In embodiments, the pivot 40 comprises a pin that extends through a hole in the pivot bar 35 and is connected to an outer side of the screen portion 25 such that a longitudinal axis of the pin acts as an axis of rotation of the pivot bar 35 about the screen portion 25. However, any suitable pivotable connection may be used for pivot 40.

Still referring to FIG. 1, pivot bar 35 has another end connected to a slide bar 45 via pivot 50. In embodiments, the pivot 50 comprises a pin that extends through a hole in the pivot bar 35 and a hole in the slide bar 45 such that a longitudinal axis of the pin acts as an axis of rotation of the pivot bar 35 about the slide bar 45. However, any suitable pivotable connection may be used for pivot 50. The pivot bar 35 and slide bar 45 may be composed of any suitable material, such as, for example, plastic or metal.

Slide bar 45 is slidingly engaged with a track 55 arranged on a side of the base portion 20 such that the slide bar 45 translates along the track 55 when the screen portion 25 is rotated relative to the base portion 20 (i.e., when the laptop computer is opened or closed). The slide bar 45 further comprises a plurality of apertures 60 spaced along its length. The apertures 60 are shown as substantially circular in FIG. 1, although any shape may be employed, such as, for example, rectangular, oval, triangular, hexagonal, etc. Any suitable number of apertures 60 may be provided in the slide bar 45, and any suitable spacing may be used between the apertures 60.

The base portion 20 comprises at least one keyhole (e.g., cavity, etc.) 65 that is adjacent to and accessible via the track 55. In embodiments, plural keyholes 65 are provided, each keyhole 65 having substantially the same shape as the apertures 60. The apertures 60 move relative to the keyholes 65 as the screen portion 25 is rotated relative to the base portion 20 and the slide bar 45 moves within the track 55. When a particular aperture 60 is aligned with the keyhole 65 (as shown at "A") a lock 70 (described in detail below) may be inserted (as indicated by dashed line "B") through the particular aperture 60 and the keyhole 65 and engaged with the base portion 20. As is readily apparent from FIG. 1, when the lock 70 extends through an aperture 60 and keyhole 65, the slide bar 45 is prevented from moving within the track 55, which, in turn, prevents the screen portion 25 from rotating relative to the base portion 20 about hinge 30. In this manner, the foldable computer 15 may be locked in an open configuration.

As described above, any suitable number of apertures 60 may be provided in the slide bar 45, and any suitable spacing may be used between the apertures 60. Moreover, more than one keyhole 65 may be provided. For example, plural substantially identical keyholes 65 may be provided along the length of the track 55 in order to provide numerous possible lockable positions of the screen portion 25 relative to the base portion 20.

Lock 70 may comprise any suitable lock that is capable of extending through the aperture 60 and keyhole 65 and engaging the base portion 20. In embodiments, the lock 70 comprises a conventional cable-type lock that includes a body 75, a shaft 80 extending from the body 75, and an engagement portion 85 on an end of the shaft 80. Also connected to the body 75 is an actuating mechanism 90 that selectively moves the engagement portion 85 between a first contracted position, in which the engagement portion 85 is smaller than the apertures 60 and keyhole 65, and a second expanded position, in which the engagement portion 85 is larger than the apertures 60 and keyhole 65. The actuating mechanism 90 may comprise, for example, a key or a rotary-dial-combination device (e.g., numbered spinwheel), as is known and no further description is believed necessary. The lock 70 may optionally comprise a cable 95 attached to the body 75, and may further optionally comprise a loop 96 at the end of the cable 95. Such locks, having a body 75, shaft 80, engagement portion 85, actuating mechanism 90, and cable 95, are known, and further description is not believed necessary.

In operation, the screen portion 25 is rotated (i.e., folded) to a desired position relative to the base portion 20 such that one of the apertures 60 is aligned with a key hole 65. The actuating mechanism 90 is used to place the engagement portion 85 in the first contracted position (in which the engagement portion 85 is smaller than an aperture 60). The engagement portion 85 is inserted through the aligned aperture 60 and key hole 65, and the actuating mechanism 90 is used to place the engagement portion 85 in the second expanded position (in which the engagement portion 85 is larger than the aperture 60). In this manner, the computer 15 is locked into a configuration such that the screen portion 25 may not be rotated (e.g., is rotatably locked) relative to the base portion. To subsequently move the screen portion 25, a user must apply the appropriate key or combination to the actuating mechanism 90 to contract the engagement portion 85 to its contracted position and remove the engagement portion 85 from the keyhole 65 and aperture 60.

Figure 2:
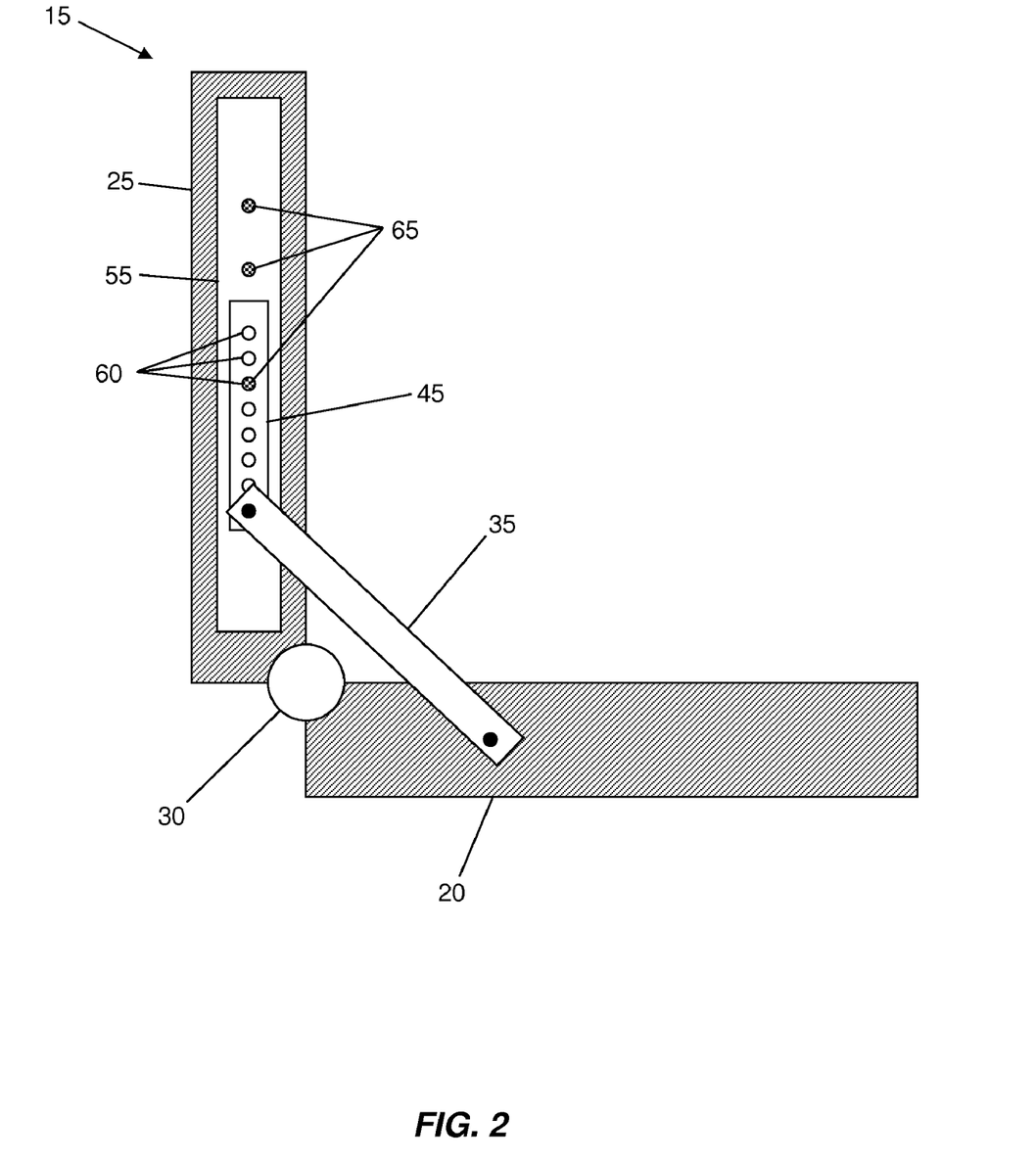
FIG. 2 shows a variation of the first embodiment according to aspects of the invention.

It should be noted that the pivot bar 35, slide bar 45, track 55, and keyhole(s) 65 are not limited to the locations shown in FIG. 1. For example, as shown in FIG. 2, the pivot bar 35 may be connected to the base portion 20 and the slide bar 45, track 55, and keyhole 65 arranged on the screen portion 25. Alternatively, the components may be arranged on other surfaces of the computer 15.

Figure 3A:
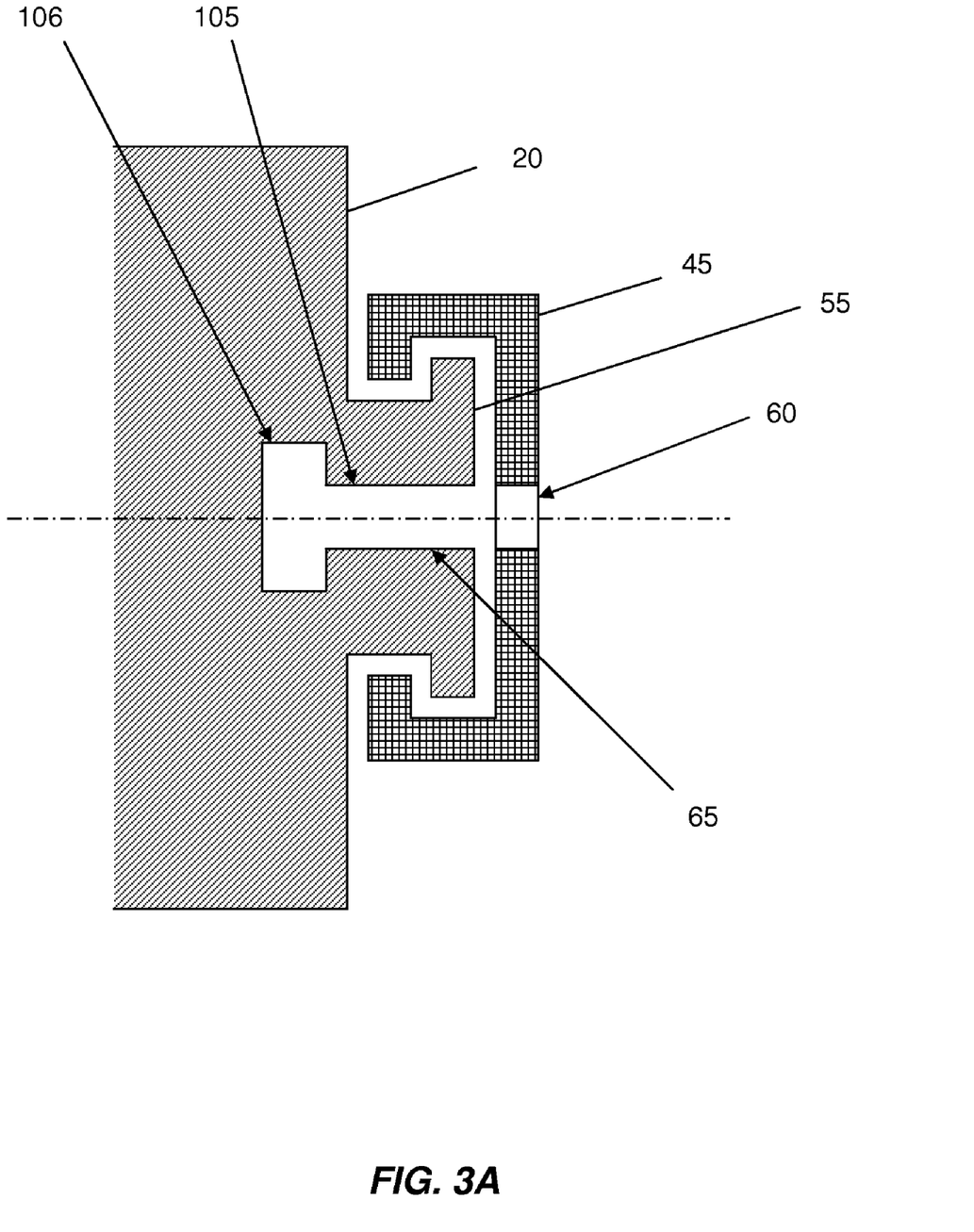
FIGS. 3A and 3B show aspects of the first embodiment according to the invention.
Figure 3B:
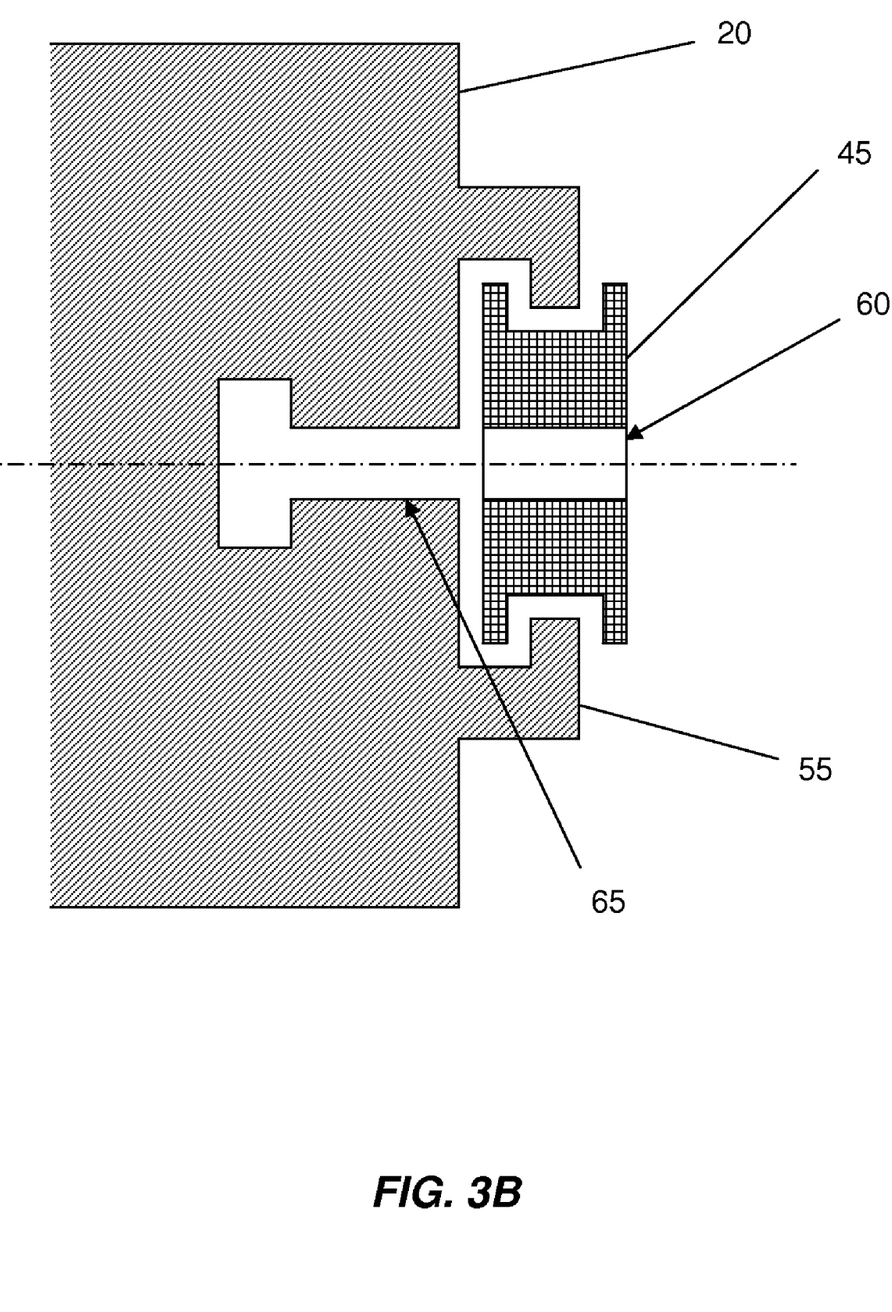

Moreover, the slide bar 45 and track 55 may be structured and arranged in any suitable fashion that allows the apertures 60 to pass over and align with the keyhole(s) 65. For example, as shown in FIG. 3A, the track 55 may comprise a substantially I-beam shape that the ends of the slide bar 45 wrap around. Or, as depicted in FIG. 3B, the slide bar 45 may comprise a substantially I-beam shape that flanges of the track 55 extend into. In embodiments, bearings, bushings, and/or lubricants may be employed to assist the motion of the slide bar 45 relative to the track 55, although the invention may be practiced without such features.

Still referring to FIGS. 3A and 3B, in embodiments, the keyhole 65 comprises a first cavity portion 105 and second cavity portion 106. The second cavity portion 106 is of sufficient size to accommodate the engagement portion 85 of the lock 70 when the engagement portion 85 is in the expanded position. The first cavity portion 105 is sized such that the engagement portion 85 may pass therethrough when the engagement portion is in the contracted position, but may not pass therethrough when in the expanded position. In this manner, the lock 70 is selectively engageable with the keyhole 65. Such configurations are known in the art, and any suitable keyhole configuration may be employed within the scope of the invention.

Figure 4:
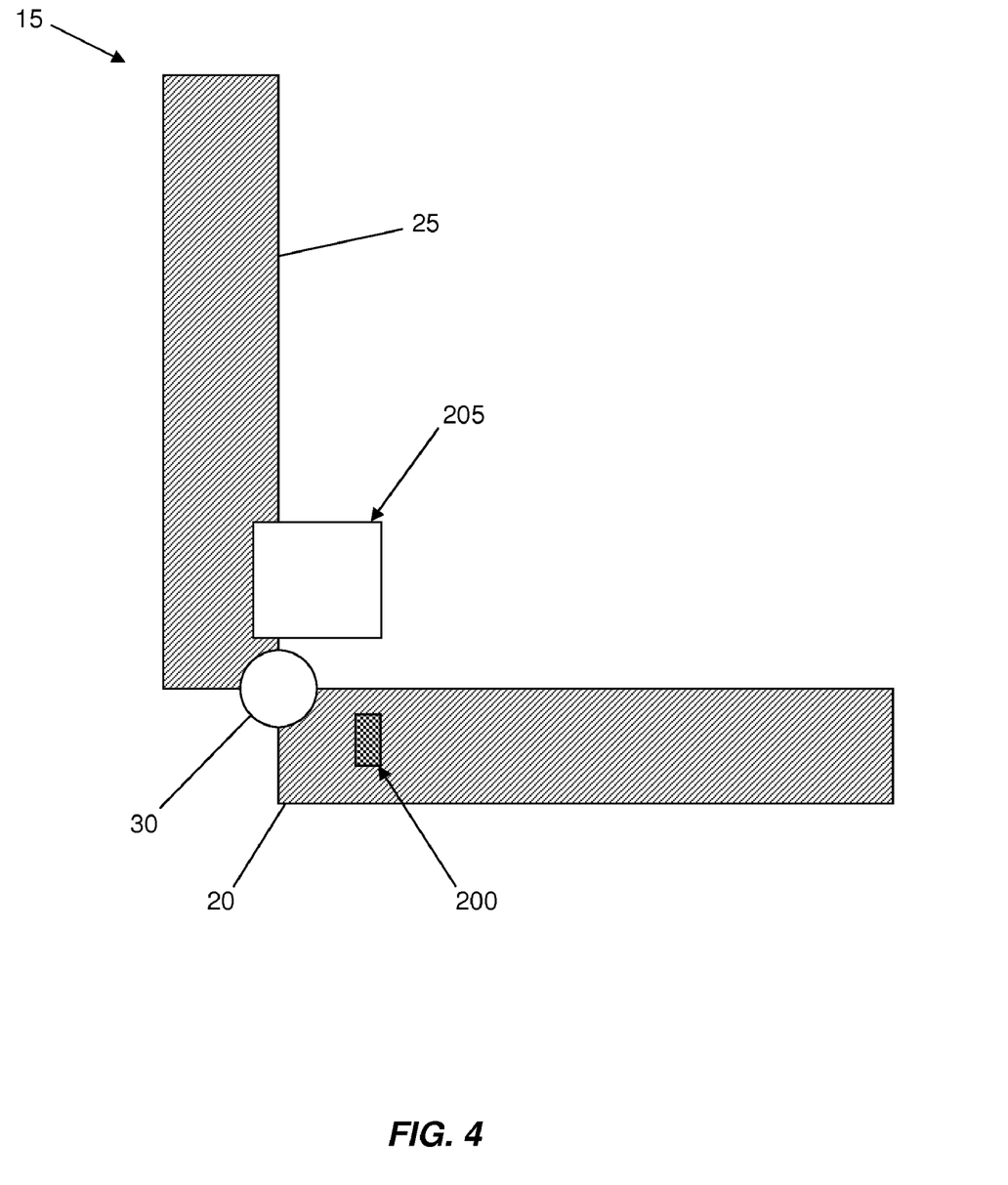
FIG. 4 shows a second embodiment of a lock system according to aspects of the invention.

FIG. 4 shows a second embodiment of a lock system according to the invention. Similar to that described above, a foldable (e.g., laptop, notebook, etc.) computer 15 comprises a base portion 20 and screen portion 25 that are moveable relative to each other via hinge 30. Keyhole 200 is arranged on the base portion 20, and abutment (e.g., blocking device) 205 is arranged on the screen portion. When a lock, such as lock 70 described above, is disposed in the keyhole 200, rotation of the screen portion 25 relative to the base portion 20 is limited by the abutment 205 coming into contact with the lock 70. That is, the abutment 205 and lock 70 arranged in the keyhole 200 cooperate to prevent the foldable computer 15 from being closed.

The keyhole 200 may comprise any size and shape hole that receives a conventional computer lock. The abutment comprises a structural element that comes into contact with a key that is engaged in the key hole 200. In embodiments, the abutment 205 comprises an integral portion of the screen portion 25. For example, the abutment 205 may be integrally formed with the screen portion 25 during a molding process. However, the abutment can also be connected to the screen portion 25 by fasteners, such as, for example, screws, adhesive, etc. In this manner, the abutment 205 may be added as a kit that is retrofitted to an existing laptop computer. Moreover, the keyhole 200 and abutment 205 may alternatively be arranged on any appropriate surfaces of the computer 15.

Figure 5A:
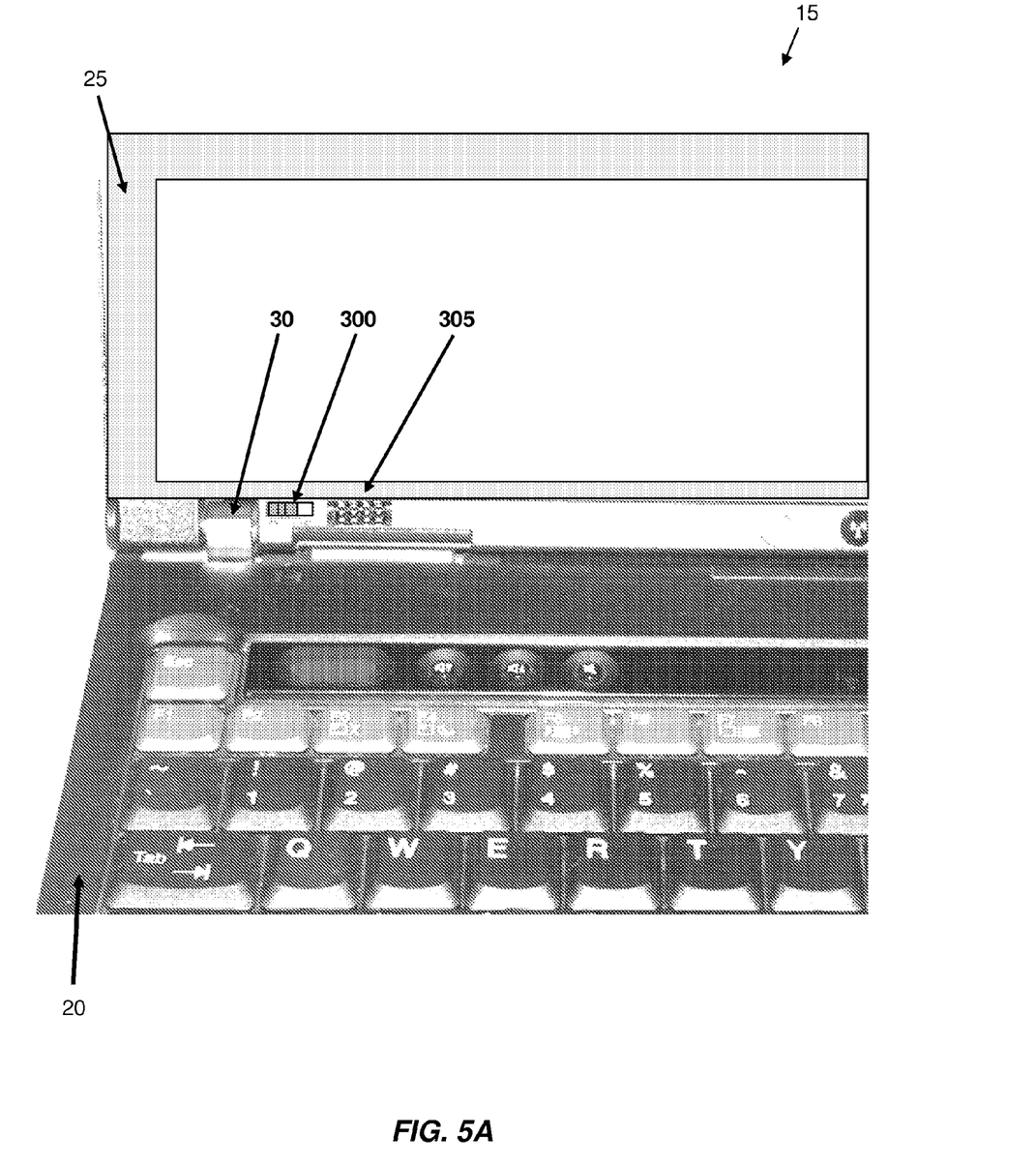
FIG. 5A shows a third embodiment of a lock system according to aspects of the invention.

FIG. 5A shows a third embodiment of a lock system according to the invention. Similar to that described above, a foldable (e.g., laptop, notebook, etc.) computer 15 comprises a base portion 20 and screen portion 25 that are moveable relative to each other via hinge 30. Arranged on the screen portion 25 is a slide tab 300 that is moveable between a first unlocked position and a second locked position. The slide tab 300 is connected to an element (not shown) that can block the rotation of the hinge 30. A rotary-dial-combination lock 305 is operatively connected to the bar, and permits or denies movement of the slide tab 300 between the first unlocked position and second locked position. That is, when the correct combination is entered on the rotary-dial-combination lock 305, the slide tab 300 can be moved between the first unlocked position and second locked position, and the hinge 30 may be locked and unlocked accordingly. However, when any combination other than the correct combination is entered on the rotary-dial-combination lock 305, the slide tab 300 cannot be moved between the first unlocked position and second locked position.

Figure 5B:
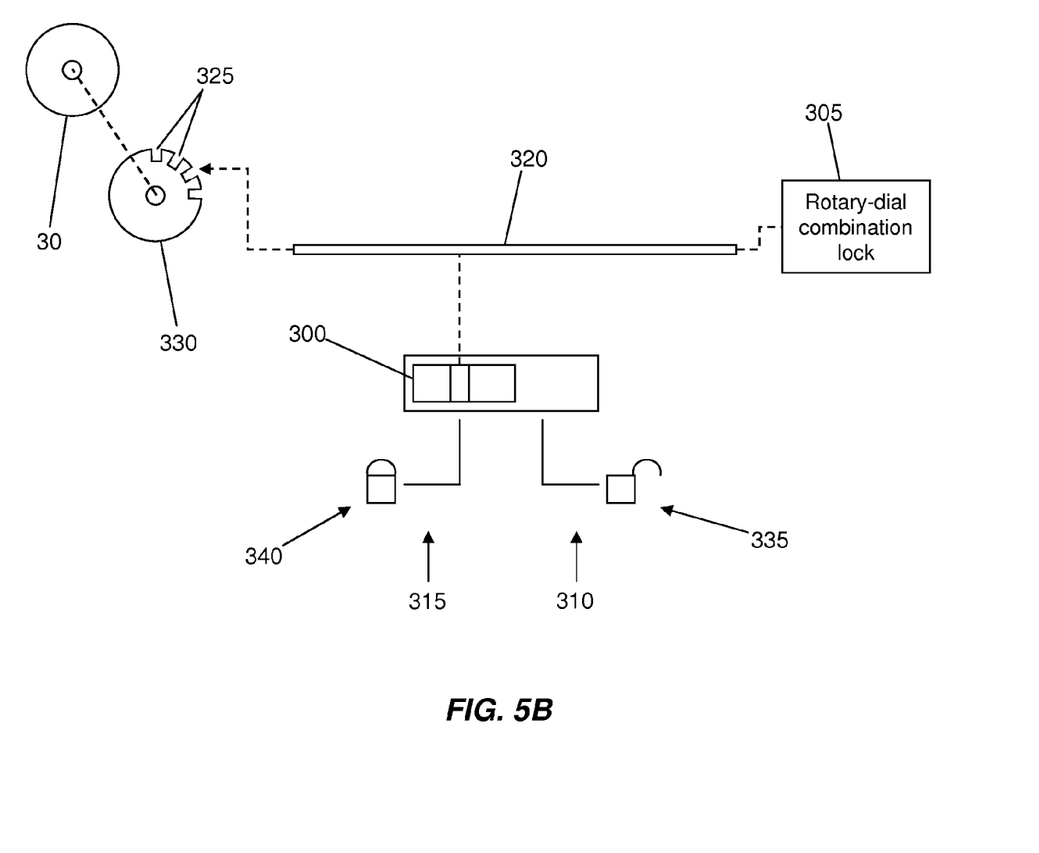
FIG. 5B shows a block diagram of an exemplary implementation of the third embodiment according to aspects of the invention.

FIG. 5B shows a functional block diagram of an exemplary implementation of the embodiment described above with respect to FIG. 5A. In this implementation, the slide tab 300 is moveable between an unlocked position 310 and a locked position 315, and is operatively connected to bar 320. When the slide tab 300 is in the locked position 315, the bar extends into one of a plurality of notches 325 of a wheel 330 that is fixed to (or part of) the hinge 30. In the locked position 315, rotation of the hinge 30, and therefore, of the screen portion 25 relative to the base portion 20, is substantially prevented. However, when the slide tab 300 is in the unlocked position 310, the bar does not extend into one of a plurality of notches 325 of the wheel 330 that is fixed to the hinge 30. In this manner, the hinge 30 is free to move, thereby allowing the screen portion 25 to move (e.g., rotate) relative to the base portion 20.

In embodiments, indicia are provided for indicating when the element is in either the unlocked position 310 or the locked position 315. For example, first indicia (e.g., a picture of an unlocked padlock) 335 may be provided on the surface of the screen portion 25 at the unlocked position of the slide tab 300. Similarly, second indicia (e.g., a picture of a locked padlock) 340 may be provided on the surface of the screen portion 25 at the locked position of the slide tab 300. It is understood that other indicia may be used within the scope of the invention.

Still referring to the FIG. 5B, the bar 320 is also operatively connected to the rotary-dial-combination lock 305. When the correct combination is entered on the rotary-dial-combination lock 305, the bar 320 is free to move, thus allowing the slide tab 300 to move between the unlocked position 310 and the locked position 315. However, when any combination other than the correct combination is entered on the rotary-dial-combination lock 305, the bar 320 is not free to move. As such, the slide tab 300 cannot be moved between the unlocked position 310 and the locked position 315.

In operation, a user may open the screen portion 25 to a desired angle relative to the base portion 20, enter the correct combination on the rotary-dial-combination lock 305, move the slide tab 300 to the locked position 315, and scramble the spinwheels (e.g., enter an incorrect combination) of the rotary-dial-combination lock 305. In this manner, the screen portion 25 is locked relative to the base portion 20 such that the angle between the screen portion 25 and base portion 20 substantially cannot be changed. Only a user with knowledge of the correct combination of the rotary-dial-combination lock 305 could unlock the device to allow the screen portion 25 to move relative to the base portion 20.

While the invention has been described in terms of embodiments, those skilled in the art will recognize that the invention can be practiced with modifications and in the spirit and scope of the appended claims.

What is claimed is:

1. A device, comprising:
a blocking device attached to a first portion of a computer;
at least one cavity arranged on a second portion of the computer;
a lock that is insertable into and selectively engageable with the at least one cavity;
wherein the first portion of the computer and the blocking device are rotatable relative to the second portion of the computer when the blocking device is attached to the first portion of the computer and the lock is not inserted into the at least one cavity, and
the first portion of the computer is substantially not rotatable relative to the second portion of the computer beyond a point of the blocking device contacting the lock when the lock is inserted into the at least one cavity.

2. The device of claim 1, wherein the blocking device is integral with the second portion of the computer.

3. The device of claim 1, wherein the blocking device is a kit retrofitted to the second portion of the computer.

4. The device of claim 1, wherein the lock comprises at least one of a key and a combination that is required to disengage the lock from the at least one cavity.

5. The device of claim 1, wherein:
the first portion of the computer comprises a screen portion of a laptop computer,
the second portion of the computer comprises a base portion of the laptop computer, and
the screen portion is pivotally connected to the base portion via a hinge.

6. A computing device, comprising:
a first computer portion pivotally connected to a second computer portion by a hinge;

an element moveable between a first position, in which the hinge is free to rotate, and a second position, in which the hinge is substantially prevented from rotating; and a lock that selectively controls movement of the element between the first and second positions, wherein the element engages at least a portion of the hinge in the first position.

7. The computing device of claim 6, wherein the first computer portion and second computer portion are comprised in one of a laptop computer and a notebook computer.

8. The computing device of claim 6, wherein the first computer portion comprises a video display or a keyboard, and the second computer portion comprises a keyboard or a video display, respectively.

9. A computing device, comprising:

a first computer portion pivotally connected to a second computer portion by a hinge;

an element moveable between a first position, in which the hinge is free to rotate, and a second position, in which the hinge is substantially prevented from rotating; and a lock that selectively controls movement of the element between the first and second positions, wherein the first computer portion comprises a video display or a keyboard, and the second computer portion comprises a keyboard or a video display, respectively, and the element and the lock are arranged on or in the first computer portion.

10. A computing device, comprising:

a first computer portion pivotally connected to a second computer portion by a hinge;

an element moveable between a first position, in which the hinge is free to rotate, and a second position, in which the hinge is substantially prevented from rotating; and a lock that selectively controls movement of the element between the first and second positions, wherein:

the element is arranged internally to the first computer portion, and the element is connected to a slide tab that is arranged externally on the first computer portion.

11. The computing device of claim 10, further comprising:

first indicia associated with the slide tab indicating when the element is in the first position; and second indicia associated with the slide tab indicating when the element is in the second position.

12. The computing device of claim 6, wherein the lock comprises a rotary-dial combination lock operatively connected to the element.

13. The computing device of claim 12, wherein:

when a correct combination is applied to the rotary-dial combination lock, the element is moveable between the first position and the second position, and when an incorrect combination is applied to the rotary-dial combination lock, the element is substantially locked in either the first position or the second position.

14. The computing device of claim 12, further comprising a slide tab operatively coupled to the element.

15. The computing device of claim 14, wherein the slide tab is arranged on an external surface of either the first computer portion or the second computer portion.

16. The computing device of claim 15, further comprising:

first indicia associated with the slide tab indicating when the element is in the first position; and second indicia associated with the slide tab indicating when the element is in the second position.

17. The computing device of claim 16, wherein the slide tab is arranged on an exterior surface of a screen portion of a laptop computer.

* * * * *